United States Patent
Wang et al.

(10) Patent No.: US 8,808,972 B2
(45) Date of Patent: *Aug. 19, 2014

(54) OPTICAL FILMS AND METHODS OF MAKING THE SAME

(75) Inventors: Jian Jim Wang, Orefield, PA (US); Paul Sciortino, Jr., Bridgewater, NJ (US); Xuegong Deng, Piscataway, NJ (US); Anguel N. Nikolov, Bridgewater, NJ (US)

(73) Assignee: Polarization Solutions, LLC, Somerset, NJ (US)

( * ) Notice: Subject to any disclaimer, the term of this patent is extended or adjusted under 35 U.S.C. 154(b) by 219 days.

This patent is subject to a terminal disclaimer.

(21) Appl. No.: 12/692,193

(22) Filed: Jan. 22, 2010

(65) Prior Publication Data

US 2010/0265571 A1 Oct. 21, 2010

Related U.S. Application Data

(63) Continuation of application No. 11/139,954, filed on May 27, 2005, now Pat. No. 7,670,758, which is a continuation-in-part of application No. 10/866,416, filed on Jun. 11, 2004, now abandoned.

(60) Provisional application No. 60/562,890, filed on Apr. 15, 2004.

(51) Int. Cl.
| | | |
|---|---|---|
| G02B 5/30 | (2006.01) | |
| C23C 16/00 | (2006.01) | |
| C23F 1/02 | (2006.01) | |
| G02B 5/18 | (2006.01) | |
| G02F 1/13363 | (2006.01) | |
| B82Y 20/00 | (2011.01) | |

(52) U.S. Cl.
CPC .......... *G02B 5/3025* (2013.01); *G02F 1/13363* (2013.01); *B82Y 20/00* (2013.01); *G02B 5/3083* (2013.01); *G02B 5/1857* (2013.01)
USPC ............. 430/321; 214/24; 359/486; 359/484; 427/162; 427/255.8

(58) Field of Classification Search
None
See application file for complete search history.

(56) References Cited

U.S. PATENT DOCUMENTS 4,099,933 A * 7/1978 Johnson et al. ................. 48/202

(Continued)

FOREIGN PATENT DOCUMENTS

| DE | 3212958 | 10/1985 |
|---|---|---|
| EP | 1103829 | * 6/2001 |

(Continued)

OTHER PUBLICATIONS

Li et al. "All dielectric high efficiency reflection gratings made with multilayer thin film coatings", Opt. Lett., vol. 20(11) pp. 1349-1351 (Jun. 1995).*

(Continued)

*Primary Examiner* — Martin Angebranndt
(74) *Attorney, Agent, or Firm* — Onello & Mello, LLP

(57) ABSTRACT

Films for optical use, articles containing such films, methods for making such films, and systems that utilize such films, are disclosed.

58 Claims, 8 Drawing Sheets

(56) References Cited

U.S. PATENT DOCUMENTS

| | | | | |
|---|---|---|---|---|
| 4,289,381 A | * | 9/1981 | Garvin et al. | 427/163.1 |
| 5,458,084 A | * | 10/1995 | Thorne et al. | 117/89 |
| 6,185,019 B1 | * | 2/2001 | Hobbs et al. | 359/30 |
| 7,203,001 B2 | * | 4/2007 | Deng et al. | 359/486 |
| 7,619,816 B2 | * | 11/2009 | Deng et al. | 359/484 |
| 7,670,758 B2 | * | 3/2010 | Wang et al. | 430/321 |
| 2002/0003664 A1 | * | 1/2002 | Mearini et al. | 359/586 |
| 2002/0191880 A1 | * | 12/2002 | Borrelli et al. | 385/11 |
| 2004/0197527 A1 | * | 10/2004 | Maula et al. | 428/172 |
| 2005/0275944 A1 | * | 12/2005 | Wang et al. | 359/576 |

FOREIGN PATENT DOCUMENTS

| | | | |
|---|---|---|---|
| GB | 2355727 | * | 5/2001 |
| JP | 02-230203 | | 12/1990 |
| JP | 07-005316 | | 1/1995 |
| JP | 09-09122 | | 9/1995 |
| JP | 11-014814 | * | 1/1999 |
| JP | 2000-284117 | | 10/2000 |
| JP | 2003-066229 | * | 3/2003 |

OTHER PUBLICATIONS

Colburn, M. et al., "Step and Flash Imprint Lithography: A New Approach to High-Resolution Patterning", Proc. SPIE, vol. 3676, pp. 379-389 (Mar. 1999).*

Kramar, J.A, et al., "Grating pitch measurements with molecular measuring machine", Proc. SPIE 3806 pp. 46-53 (Jul. 1999).*

Doumuki et al., "An aluminum-wire polarizer fabricated on a gallium-arsenide photodiode", Appl. Phys. Lett., vol. 71(5) pp. 686-688 (Aug. 1997).*

Stenkamp et al., "Grid polarizer for the visible spectral region", Proc. SPIE 2213 pp. 288-296 (1994).*

Yu et al., "Fabricating of large area 100 nm pitch grating by spatial frequency doubling and nanoimprint lithography for sub-wavelength optical applications", J. Vac Sci. Technol. B., vol. 19(6) pp. 2816-2819 (2001).*

King et al. "High filling fraction inverted ZnS opals fabricated by atmoic layer deposition", Appl. Phys. Lett., vol. 83(13) pp. 2566-2568 (Sep. 2003).*

* cited by examiner

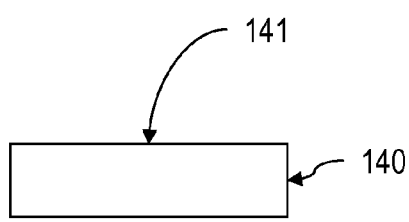
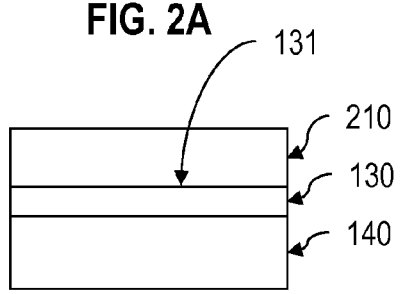
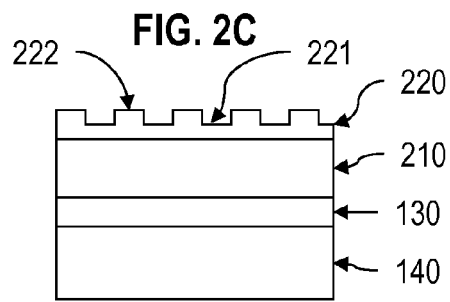
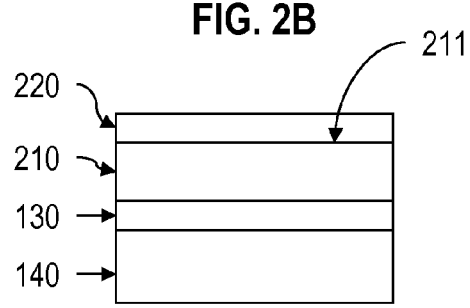
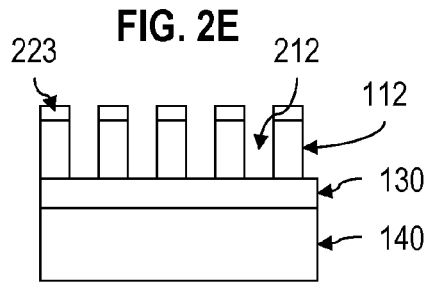
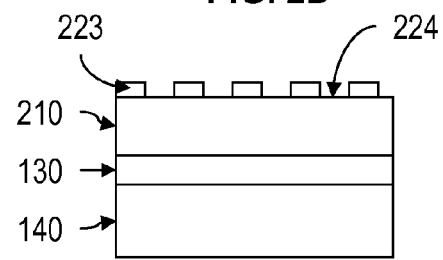
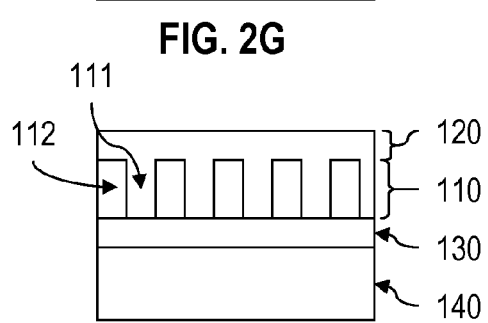
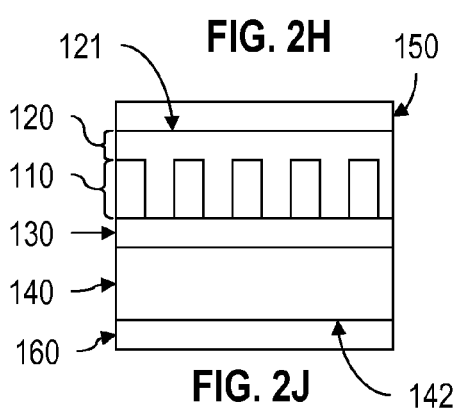

OPTICAL FILMS AND METHODS OF MAKING THE SAME

CROSS-REFERENCE TO RELATED APPLICATIONS

This application is a continuation-in-part application of and claims priority under 35 U.S.C. §120 to U.S. patent application Ser. No. 10/866,416, now abandoned, entitled "OPTICAL FILMS AND METHODS OF MAKING THE SAME," filed on Jun. 11, 2004, which claims priority under 35 U.S.C. §119 to U.S. Provisional Patent Application No. 60/562,890, entitled "PRECISION PHASE RETARDERS AND WAVEPLATES AND THE METHOD FOR MAKING THE SAME," and filed on Apr. 15, 2004, the entire contents both of which are hereby incorporated by reference.

TECHNICAL FIELD

This invention relates to optical films and related articles, systems and methods.

BACKGROUND

Optical devices and optical systems are commonly used where manipulation of light is desired. Examples of optical devices include lenses, polarizers, optical filters, antireflection films, retarders (e.g., quarter-waveplates), and beam splitters (e.g., polarizing and non-polarizing beam splitters).

SUMMARY

This invention relates to films for optical use, articles containing such films, methods for making such films, and systems that utilize such films.

In general, in a first aspect, the invention features methods that include filling at least about 10% of a volume of a trench in a surface of a layer of a first material of an article by sequentially forming a plurality of monolayers of a second material different from the first material within the trench, wherein the layer transmits about 50% or more of light of wavelength λ having a first polarization state incident on the layer along a path, the layer blocks about 80% or more of light of wavelength λ having a second polarization state incident on the layer along the path, the first and second polarization states being orthogonal, and λ is between about 150 nm and about 5,000 nm.

Implementations of the methods can include one or more of the following features and/or features of other aspects. For example, the trench can be formed by etching a continuous layer of the first material. Etching the first layer can include reactive ion etching.

In some embodiments, the trench is formed lithographically. For example, the trench can be formed using nano-imprint lithography. Nano-imprint lithography can include forming a pattern in a thermoplastic material. Alternatively, or additionally, the nano-imprint lithography can include forming a pattern in a UV curable material. As another example, the trench can be formed using holographic lithography. Holographic lithography can include immersing a layer of the first material in a fluid having a refractive index higher than a refractive index of air. Holographic lithography can include exposing a layer of a resist material to an interference pattern formed from radiation having a wavelength of about 400 nm or less (e.g., about 351 nm, about 266 nm).

The trench can have a width of about 1,000 nm or less (e.g., about 750 nm or less, about 500 nm or less, about 300 nm or less, about 200 nm or less, about 100 nm or less, about 80 nm or less, about 70 nm or less, about 60 nm or less, about 50 nm or less, about 40 nm or less). The trench can have a depth of about 10 nm or more (e.g., about 20 nm or more, about 30 nm or more, about 50 nm or more, about 80 nm or more, about 100 nm or more, about 130 nm or more, about 150 nm or more, about 200 nm or more, about 250 nm or more, about 300 nm or more).

The first material can include a metal. In some embodiments, the first material includes at least one metal selected from the group consisting of Al, Au, Ag, and Cu.

The methods can further include forming one or more monolayers of a third material within the trench, wherein the third material is different from the first and second materials. The monolayers of the second and third materials can form a nanolaminate material. At least about 50% of the volume of the trench is filled by sequentially forming the plurality of monolayers within the trench. For example, at least about 80%, such as 90% or more, of the volume of the trench can be filled by sequentially forming the plurality of monolayers within the trench. In some embodiments, at least about 99% of the volume of the trench is filled by sequentially forming the plurality of monolayers within the trench.

The layer of the first material and the second material can form a continuous layer. Forming the plurality of monolayers of the second material can include depositing a monolayer of a precursor and exposing the monolayer of the precursor to a reagent to provide a monolayer of the second material. The reagent can chemically react with the precursor to form the second material. For example, the reagent can oxidize the precursor to form the second material. Depositing the monolayer of the precursor can include introducing a first gas comprising the precursor into a chamber housing the article. A pressure of the first gas in the chamber can be about 0.01 to about 100 Torr while the monolayer of the precursor is deposited. Exposing the monolayer of the precursor to the reagent can include introducing a second gas comprising the reagent into the chamber. A pressure of the second gas in the chamber can be about 0.01 to about 100 Torr while the monolayer of the precursor is exposed to the reagent. A third gas can be introduced into the chamber after the first gas is introduced and prior to introducing the second gas. The third gas can be inert with respect to the precursor. The third gas can include at least one gas selected from the group consisting of helium, argon, nitrogen, neon, krypton, and xenon. The precursor can include at least one precursor selected from the group consisting of tris(tert-butoxy)silanol, $(CH_3)_3Al$, $TiCl_4$, $SiCl_4$, $SiH_2Cl_2$, $TaCl_3$, $AlCl_3$, Hf-ethaoxide and Ta-ethaoxide.

The second material can include at least one material selected from a group consisting of $SiO_2$, $SiN_x$, Si, $Al_2O_3$, $ZrO_2$, $Ta_2O_5$, $TiO_2$, $HfO_2$, $Nb_2O_5$, and $MgF_2$.

The layer of the first material can include additional trenches formed in the surface of the layer. The method can include filling at least about 10% (e.g., at least about 50%, at least about 80%, at least about 90%, at least about 99%) of a volume of each of the additional trenches by sequentially forming the plurality of monolayers of the second material within the additional trenches. The trenches can be separated by rows of the first material.

The layer of the first material can form a surface relief grating. The surface relief grating can have a grating period of about 500 nm or less (e.g., about 300 nm or less, about 200 nm or less, about 180 nm or less, about 160 nm or less, about 150 nm or less, about 140 nm or less, about 130 nm or less, about 120 nm or less, about 110 nm or less, about 100 nm or less).

The layer can transmit about 80% or more (e.g., about 90% or more, about 95% or more, about 98% or more, about 99% or more) of light of wavelength λ having the first polarization state incident on the layer along the path. Alternatively, or additionally, the layer can block about 90% or more (e.g., about 95% or more, about 97% or more, about 98% or more, about 99% or more) of light of wavelength λ having the second polarization state incident on the layer along the path.

The first and second polarization states can be linear polarization states. The first and second polarization states can be TM and TE polarization states, respectively.

In some embodiments, λ is between about 400 nm and about 700 nm. In certain embodiments, λ is between about 400 nm and about 1,100 nm. In embodiments, λ is between about 1,250 nm and about 1,700 nm. It some embodiments, λ is between about 150 nm and about 300 nm.

The layer can transmit about 50% or more of light of wavelength λ' having a first polarization state incident on the layer along a path and the layer can block about 80% or more of light of wavelength λ' having a second polarization state incident on the layer along the path, wherein |λ−λ'| is about 50 nm or more (e.g., about 100 nm or more, about 150 nm or more, about 200 nm or more, about 250 nm or more, about 300 nm or more, about 350 nm or more, about 400 nm or more, about 500 nm or more).

The methods can include forming a layer of the second material over the filled trench by sequentially forming monolayers of the second material over the trench. The layer of the second material can have a surface with an arithmetic mean roughness of about 100 nm or less (e.g., about 50 nm or less, about 40 nm or less, about 30 nm or less, about 20 nm or less).

The method can include forming an anti-reflection film on a surface of the article. The article can include a substrate supporting the layer of the first material. The substrate can include a layer of an inorganic glass material (e.g., BK7 glass).

In general, in another aspect, the invention features methods that include forming a polarizing layer using atomic layer deposition.

Implementations of the methods can include one or more of the following features and/or features of other aspects. For example, forming the polarizing layer can include forming a grating layer comprising a first material. The polarizing layer can transmit about 50% or more of light of wavelength λ having a first polarization state incident on the layer along a path. The polarizing layer can block about 80% or more of light of wavelength λ having a second polarization state incident on the layer along the path, the first and second polarization states being orthogonal, where λ is between about 150 nm and about 5,000 nm.

The first material can include a metal. The first material can include at least one metal selected from the group consisting of Al, Au, Ag, Cu, and Cr.

The polarizing layer can be formed by using atomic layer deposition to form one or more monolayers of a first material on a grating comprising a plurality of elongated portions of a second material different from the first material.

In general, in a further aspect, the invention features articles that include a continuous layer including rows of a first material alternating with rows of a nanolaminate material, wherein the continuous layer transmits about 50% or more of light of wavelength λ having a first polarization state incident on the layer along a path and the layer blocks about 80% or more of light of wavelength λ having a second polarization state incident on the layer along the path, wherein the first and second polarization states are orthogonal and λ is between about 150 nm and about 5,000 nm. Embodiments of the article can include one or more of the features of other aspects. The articles can be formed using the methods of other aspects.

In general, in another aspect, the invention features articles that include a polarizing layer comprising a nanolaminate material. Embodiments of the article can include one or more of the features of other aspects. The articles can be formed using the methods of other aspects.

Among other advantages, the methods can be used to form nanostructured polarizers that operate over broad wavelength bands. For example, the methods can be used to form broadband polarizers for the visible and near infrared portion of the electromagnetic spectrum (e.g., from about 400 nm to about 2,000 nm).

In some embodiments, the methods can be used to form periodic nanostructured layers having relatively large aspect ratios and relatively short periods. For example, periodic nanostructures having periods substantially less than visible wavelengths can be formed (e.g., about 200 nm or less), and these structures can have aspect ratios of about 2:1 or greater.

The methods also include techniques for depositing conformal coatings onto the surface of a nanostructured layer. The conformal coating techniques can be used to homogeneously deposit materials within structures in a nanostructured layer, forming continuous nanostructured layers. As an example, atomic layer deposition can be used to fill trenches in a nanostructured layer. Where the material deposited by atomic layer deposition is optically different from the material composing the nanostructured layer, the result is a physically continuous layer that is optically nanostructured.

Continuous, nanostructured layers can be formed that have substantially planar exposed surfaces. Thus, additional planar layers (e.g., optical thin films, such as antireflection films) can be readily deposited onto nanostructured layers, providing compound, monolithic planar devices. Moreover, devices that include these layers can be relatively robust (e.g., mechanically robust) compared to devices that include nanostructured layers that are not continuous.

Filling nanostructured layers can also effectively seal the nanostructured layer, reducing degradation of the nanostructured layer by environmental factors, such as moisture and/or atmospheric oxygen, for example.

Nanostructured articles, such as nanostructured polarizers, can be formed from inorganic materials that do not degrade to the extend organic materials can when exposed to intense radiation sources for extended periods.

In some embodiments, nanostructured layers can be used to form polarizers that have relatively high pass-state transmission at wavelengths of interest. For example, polarizers be formed from materials that have relatively high transmission and can include one or more antireflection films on one or more interfaces that reduce reflection of light at wavelengths of interest.

The methods can be used to form polarizer arrays.

Other features, and advantages of the invention will be apparent from the description and drawings, and from the claims.

DESCRIPTION OF DRAWINGS

FIGS. 2A-2J show steps in the manufacture of the polarizer shown in FIG. 1.

Like reference symbols in the various drawings indicate like elements.

DETAILED DESCRIPTION

Figure 1:
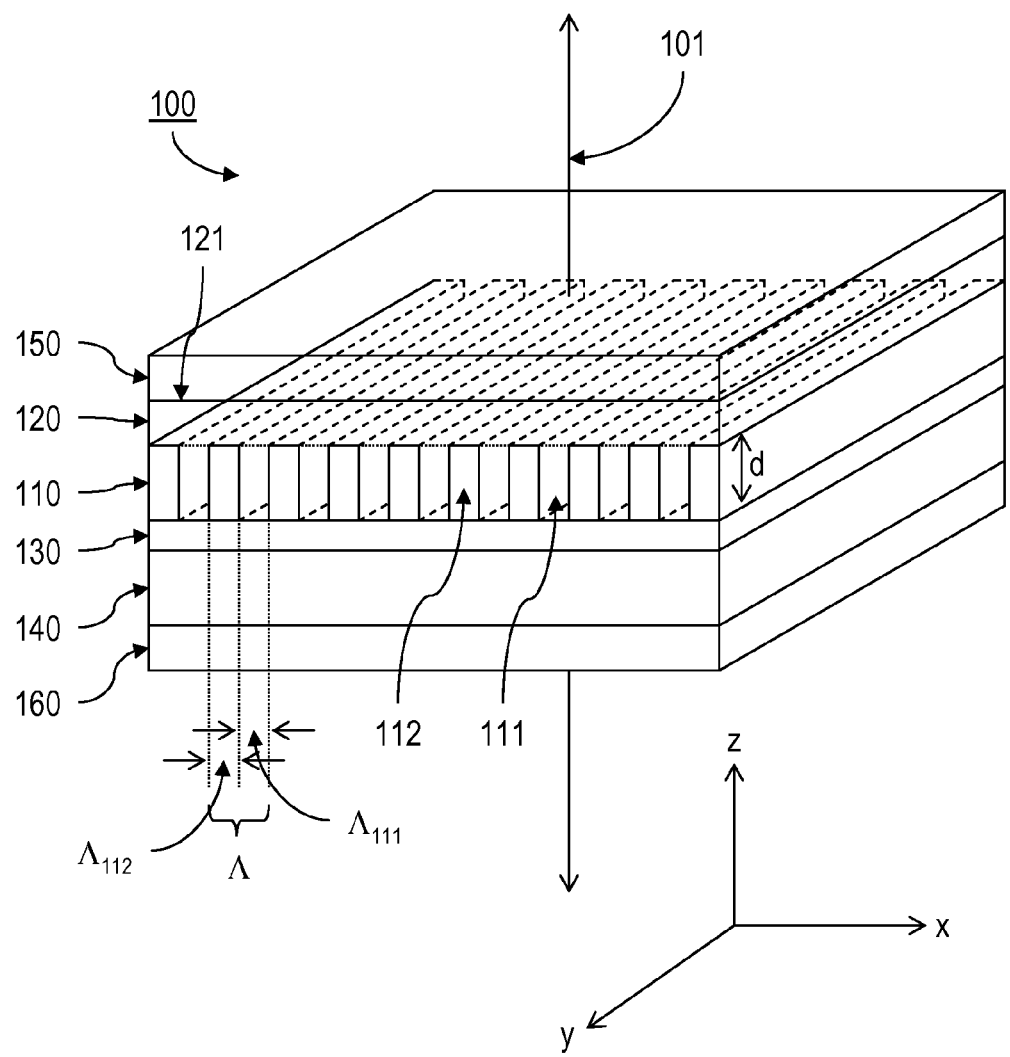
FIG. 1 is a perspective view of an embodiment of an polarizer.

Referring to FIG. 1, a linear polarizer 100 includes a grating layer 110 and two antireflection films 150 and 160. Linear polarizer 100 also includes a substrate 140, an etch stop layer 130, and a cap layer 120. Grating layer 110 includes elongated portions 111 having a first composition and portions 112 having a different composition. The different compositions have different optical properties for light of wavelength $\lambda$.

Grating layer 110 linearly polarizes incident light of wavelength $\lambda$ propagating along an axis 101, parallel to the z-axis of the Cartesian coordinate system shown in FIG. 1. In other words, for light of wavelength $\lambda$ incident on linear polarizer 100 propagating parallel to the z-axis, linear polarizer 100 transmits a relatively large amount of the component of incident light plane-polarized in the x-direction (referred to as "pass" state polarization) while blocking a relatively large amount of the component plane-polarized in the y-direction (referred to as "block" state polarization). A layer transmits a relatively large amount of a component of incident light if it transmits about 60% or more of the incident component (e.g., about 80% or more, about 90% or more, about 95% or more, about 98% or more, about 99% or more). A layer blocks a relatively large amount of a component of incident light if it blocks about 80% or more of the incident component (e.g., about 90% or more, about 95% or more, about 98% or more, about 99% or more). In general, $\lambda$ is between about 150 nm and about 5,000 nm. In certain embodiments, $\lambda$ corresponds to a wavelength within the visible portion of the electromagnetic spectrum (e.g., from about 400 nm to about 700 nm).

In some embodiments, linear polarizer 100 polarizes radiation at more than one wavelength, such as for a continuous band of wavelengths. For example, linear polarizer 100 can polarize radiation for a band of wavelengths about 50 nm wide or more (e.g., about 100 nm wide or more, about 200 nm wide or more, about 300 nm wide or more). In certain embodiments, linear polarizer 100 polarizes radiation, for substantially the entire visible portion of the electromagnetic spectrum (e.g., for $\lambda$ from about 400 nm to about 700 nm). Alternatively, linear polarizer 100 can polarize radiation for substantially the entire near infrared portion of the electromagnetic spectrum (e.g., from about 1,200 nm to 2,000 nm). In certain embodiments, linear polarizer 100 polarizes radiation for substantially the entire visible and near infrared portions of the electromagnetic spectrum (e.g., from about 400 nm to about 2,000 nm)

Furthermore, while linear polarizer 100 polarizes incident radiation propagating parallel to the z-axis, in some embodiments polarizer 100 can polarize radiation at $\lambda$ for radiation at non-normal angles of incidence (i.e., for radiation incident on linear polarizer 100 propagating at an angle $\theta$ with respect to the z-axis, where $\theta$ is non-zero). In certain embodiments, linear polarizer 100 can polarize radiation incident at more than one angle of incidence, such as for a range of incident angles. For example, in some embodiments, linear polarizer 100 polarizes radiation incident within a cone of incident angles for $\theta$ of about 10° or more (e.g., about 15° or more, about 20° or more). Note that for non-normal incidence, the pass state corresponds to light polarized parallel to the x-z plane, while the block state corresponds to light polarized orthogonal to the x-z plane.

Generally, linear polarizer 100 blocks a relatively large amount of incident radiation at $\lambda$ having the block state polarization by reflecting and/or absorbing a relatively large amount of the block state radiation. For example, linear polarizer 100 can reflect about 80% or more of incident radiation at $\lambda$ having the block polarization state (e.g., about 90% or more, about 95% or more). When linear polarizer 100 reflects a relatively large amount block state radiation, absorption of the block state radiation is relatively low. For example, block state absorption can be about 10% or less (e.g., about 5% or less).

Alternatively, in certain embodiments, linear polarizer 100 absorbs a relatively large amount of the incident radiation at $\lambda$ having the block polarization state. For example, linear polarizer 100 can absorb about 30% or more of the block state polarization (e.g., about 40% or more, about 50% or more).

Linear polarizer 100 can have a relatively high extinction ratio, $E_T$, for transmitted light at $\lambda$. For transmitted light, the extinction ratio refers to the ratio of pass state intensity at $\lambda$ to the block state intensity transmitted by linear polarizer 100. $E_T$ can be, for example, about 30 or more at $\lambda$ (e.g., about 50 or more, about 100 or more, about 150 or more). In certain embodiments where block state transmission is relatively low, $E_T$ can be very high, such as about 1000 or more.

In some embodiments, linear polarizer can have a relatively high extinction ratio, $E_R$, for reflected light at $\lambda$. $E_R$ is the ratio of the reflected intensity of block state radiation to the reflected intensity of pass state radiation at $\lambda$. $E_R$ can be, for example, about 30 or more (e.g., about 50 or more, about 100 or more, about 150 or more).

In certain embodiments, both $E_T$ and $E_R$ are relatively high.

Turning now to the structure of grating layer 110, elongated portions 111 and 112 extend along the y-direction, forming a periodic structure consisting of a series of alternating rows, where adjacent rows have different optical properties. The rows corresponding to portions 111 have a width $\Lambda_{111}$ in the x-direction, while the rows corresponding to portions 112 have a width $\Lambda_{112}$ in the x-direction. The grating period, $\Lambda$, equal to $\Lambda_{111}+\Lambda_{112}$, is smaller than $\lambda$ and as a result light of wavelength $\lambda$ interacts with grating layer 110 without encountering significant high-order diffraction that can occur when light interacts with periodic structures. Grating layer 110 is an example of a nanostructured layer.

In general, $\Lambda_{111}$ can be about $0.2\lambda$ or less (e.g., about $0.1\lambda$ or less, about $0.05\lambda$ or less, about $0.04\lambda$ or less, about $0.03\lambda$ or less, about $0.02\lambda$ or less, $0.01\lambda$ or less). For example, in some embodiments, $\Lambda_{111}$ is about 200 nm or less (e.g., about 150 nm or less, about 100 nm or less, about 80 nm or less, about 70 nm or less, about 60 nm or less, about 50 nm or less, about 40 nm or less, about 30 nm or less). Similarly, $\Lambda_{112}$ can be about $0.2\lambda$ or less (e.g., about $0.1\lambda$ or less, about $0.05\lambda$ or less, about $0.04\lambda$ or less, about $0.03\lambda$ or less, about $0.02\lambda$ or less, $0.01\lambda$ or less). For example, in some embodiments, $\Lambda_{112}$ is about 200 nm or less (e.g., about 150 nm or less, about 100 nm or less, about 80 nm or less, about 70 nm or less, about 60 nm or less, about 50 nm or less, about 40 nm or less, about 30 nm or less). $\Lambda_{111}$ and $\Lambda_{112}$ can be the same as each other or different.

In general, $\Lambda$ is less than $\lambda$, such as about $0.5\lambda$ or less (e.g., about $0.3\lambda$ or less, about $0.2\lambda$ or less, about $0.1\lambda$ or less, about $0.08\lambda$ or less, about $0.05\lambda$ or less, about $0.04\lambda$ or less, about $0.03\lambda$ or less, about $0.02\lambda$ or less, $0.01\lambda$ or less). In some embodiments, $\Lambda$ is about 500 nm or less (e.g., about 300 nm or less, about 200 nm or less, about 150 nm or less, about 130 nm or less, about 100 nm or less, about 80 nm or less, about 60 nm or less, about 50 nm or less, about 40 nm or less).

The duty cycle of grating layer, given by the ratio $\Lambda_{112}:\Lambda$, can vary as desired. In some embodiments, the duty cycle is less than about 50% (e.g., about 40% or less, about 30% or less, about 20% or less). Alternatively, in certain embodiments, the duty cycle is more than about 50% (e.g., about 60% or more, about 70% or more, about 80% or more).

While grating layer 110 is shown as having 19 portions, in general, the number of portions in a grating layer may vary as desired. The number of portions depends on the period, $\Lambda$, and the area required by the linear polarizer's end use application. In some embodiments, grating layer 110 can have about 50 or more portions (e.g., about 100 or more portions, about 500 or more portions, about 1,000 or more portions, about 5,000 or more portions, about 10,000 or more portions, about 50,000 or more portions, about 100,000 or more portions, about 500,000 more portions).

The thickness, d, of grating layer 110 measured along the z-axis can vary as desired. In general, the thickness of layer 110 is selected based on the refractive indices of portions 111 and 112 and the desired optical properties of grating layer 110 at $\lambda$. In some embodiments, d can be about 50 nm or more (e.g., about 75 nm or more, about 100 nm or more, about 125 nm or more, about 150 nm or more, about 200 nm or more, about 250 nm or more, about 300 nm or more, about 400 nm or more, about 500 nm or more, about 1,000 or more, such as about 2,000 nm).

The aspect ratio of grating layer thickness, d, to $\Lambda_{111}$ and/or d to $\Lambda_{112}$ can be relatively high. For example d:$\Lambda_{111}$ and/or d:$\Lambda_{112}$ can be about 2:1 or more (e.g., about 3:1 or more, about 4:1 or more, about 5:1 or more, about 8:1 or more, about 10:1 or more).

In general, the composition of portions 111 and 112 are selected so that polarizer 100 has desired polarizing properties. Portions 111 and/or 112 can include inorganic and/or organic materials. Examples of inorganic materials include metals, semiconductors, and inorganic dielectric materials (e.g., glass). Examples of organic materials include polymers. In some embodiments, portions 111 and/or portions 112 include one or more dielectric materials, such as dielectric oxides (e.g., metal oxides), fluorides (e.g., metal fluorides), sulphides, and/or nitrides (e.g., metal nitrides). Examples of oxides include $SiO_2$, $Al_2O_3$, $Nb_2O_5$, $TiO_2$, $ZrO_2$, $HfO_2$, $SnO_2$, $ZnO$, $ErO_2$, $Sc_2O_3$, and $Ta_2O_5$. Examples of fluorides include $MgF_2$. Other examples include $ZnS$, $SiN_x$, $SiO_yN_x$, $AlN$, $TiN$, and $HfN$.

In certain embodiments, portions 111 and/or portions 112 include a metal, such as Au, Ag, Al, Cr, and Cu. Portions 111 and/or portions 112 can be formed from more than one metal (e.g., portions 111 and/or portions 112 can be formed from a metal alloy).

The compositions of portions 111 and 112 are typically selected based on their optical properties and their compatibility with the processes used to manufacture polarizer 100 and their compatibility with the materials used to form other layers of polarizer 100. Typically, portions 111 are composed of a material that is transmissive at $\lambda$, while portions 112 are composed of a material that is non-transmissive at $\lambda$.

A one millimeter thick sample of a transmissive material transmits about 80% or more of radiation at $\lambda$ normally incident thereon (e.g., about 90% or more, about 95% or more, about 98% or more, about 99% or more). Examples of transmissive materials for visible and infrared wavelengths include various dielectric materials, such as $SiO_2$.

A one millimeter thick sample of a non-transmissive material transmits less than about 1% or less of radiation at $\lambda$ normally incident thereon (e.g., about 0.5% or less, about 0.1% or less, about 0.01% or less, about 0.001% or less). Non-transmissive materials include materials that reflect and/or absorb a relatively large amount of radiation at $\lambda$. Examples of non-transmissive materials for visible and infrared wavelengths include various metals, such as Al, Au, Ag, Cr, and Cu. Al and Ag are examples of materials that have high reflectance across the visible portion of the electromagnetic spectrum, while Au and Cu have high reflectance for the yellow and red portions of the spectrum, while absorbing relatively more of the shorter visible wavelengths (e.g., the green and blue wavelengths).

In some embodiments, the composition of portions 111 and portions 112 have a relatively low absorption at $\lambda$, so that grating layer 110 has a relatively low absorption at $\lambda$. For example, grating layer 110 can absorb about 10% or less of radiation at $\lambda$ propagating along axis 101 (e.g., about 5% or less, about 3% or less, about 2% or less, about 1% or less).

Portions 111 and/or portions 112 can be formed from a single material or from multiple different materials. In some embodiments, one or both of portions 111 and 112 are formed from a nanolaminate material, which refers to materials that are composed of layers of at least two different materials and the layers of at least one of the materials are extremely thin (e.g., between one and about 10 monolayers thick). Optically, nanolaminate materials have a locally homogeneous index of refraction that depends on the refractive index of its constituent materials. Varying the amount of each constituent material can vary the refractive index of a nanolaminate. Examples of nanolaminate portions include portions composed of $SiO_2$ monolayers and $TiO_2$ monolayers, $SiO_2$ monolayers and $Ta_2O_5$ monolayers, or $Al_2O_3$ monolayers and $TiO_2$ monolayers Generally, portions 111 and/or portions 112 can include crystalline, semi-crystalline, and/or amorphous portions. Typically, an amorphous material is optically isotropic and may transmit radiation better than portions that are partially or mostly crystalline. As an example, in some embodiments, both portions 111 and 112 are formed from amorphous materials, such as amorphous dielectric materials (e.g., amorphous $TiO_2$ or $SiO_2$). Alternatively, in certain embodiments, portions 111 are formed from a crystalline or semi-crystalline material (e.g., crystalline or semi-crystalline Si), while portions 112 are formed from an amorphous material (e.g., an amorphous dielectric material, such as $TiO_2$ or $SiO_2$).

The structure and composition of grating layer 110 is selected based on the desired optical performance of linear polarizer 100. Structural parameters that affect the optical performance of linear polarize 100 include, for example, d, $\Lambda$, $\Lambda_{111}$, and $\Lambda_{112}$. Typically, varying a single parameter affects multiple different performance parameters. For example, the overall transmission of the polarizer at $\lambda$ can be varied by changing the relative thickness of portions formed from a transmissive material, $\Lambda_{111}$, to the thickness or portions formed from a non-transmissive material, $\Lambda_{112}$. However, while a higher ratio $\Lambda_{111}/\Lambda_{112}$ may provide relatively higher transmission of the pass state polarization, it also results in higher transmission of the block state polarization, which decreases $E_T$. As a result, optimizing the polarizer's performance involves trade offs between different performance parameters and the polarizer's structure and composition is varied depending on the desired performance for the polarizer's end use application.

In general, to effectively polarize light at wavelength λ, the period Λ of the grating layer should be shorter than λ, such as about λ/4 or less (e.g., about λ/6 or less, about λ/10 or less). Moreover, for effective broadband performance, Λ should be shorter than the shortest wavelength in the wavelength band. For a broadband polarizer in the visible spectrum, for example, Λ should be less than about 300 nm, such as about 200 nm or less (e.g., about 150 nm or less, about 130 nm or less, about 110 nm or less, about 100 nm or less, about 90 nm or less, about 80 nm or less).

Typically, the reflectance of grating layer 110 can be increased by forming at least some of the portions from a material having a relatively high reflectance at λ. The reflectance of the polarize can also be increased by increasing the relative size of the portions of reflective material relative to the portions of transmissive material. In other words, a larger duty cycle can provide increased reflectance at λ. However, this can reduce pass state transmission. Conversely, the transmission of grating layer 110 can be increased by reducing the duty cycle. Typically, the duty cycle is in the range of about 20% to about 80%.

In some embodiments, $E_T$ can be increased by increasing the depth of grating layer 110, d. Increasing d can provide increased $E_T$ without substantially reducing the amount of pass state transmission.

As discussed, the optical properties of the materials composing portions 111 and 112 also affect the optical performance of polarizer 100. For example, polarizer transmission can be increased by forming portion 111 from materials that have a relatively high transmission at λ.

Furthermore, forming portions 111 from a material that has a relatively low refractive index at λ can reduce reflection of the pass state radiation. For example, portions 111 can be formed from a material having a refractive index of about 1.6 or less at 1 (e.g., about 1.55 or less, about 1.5 or less, about 1.45 or less). $SiO_2$ is an example of a material with a relatively low refractive index in the visible portion of the electromagnetic spectrum. Reflection can be reduced because the effective refractive index of grating layer 110 is reduced relative to a grating layer where portions 111 are formed from a material having a relatively high refractive index.

Selecting a material or materials having a relatively low refractive index at λ for any part of polarizer 100 that contact portions 112 can improve optical characteristics of the grating layer, such as, for example, $E_T$.

Furthermore, where high reflectivity of the block state polarization is desired, portions 112 should be formed from a material that has a high reflectivity at λ. Moreover, where high reflectivity of the block state polarization is desired for a broad band of wavelengths, the material should have a relatively high reflectivity for all wavelengths in the band. As an example, Al provides higher broadband reflectivity for visible wavelengths compared to Au or Cu, for example, which have higher absorption for shorter visible wavelengths.

Referring now to other layers in polarizer 100, in general, substrate 140 provides mechanical support to polarizer 100. In certain embodiments, substrate 140 is transparent to light at wavelength λ, transmitting substantially all light impinging thereon at wavelength λ (e.g., about 90% or more, about 95% or more, about 97% or more, about 99% or more, about 99.5% or more).

In general, substrate 140 can be formed from any material compatible with the manufacturing processes used to produce retarder 100 that can support the other layers. In certain embodiments, substrate 140 is formed from a glass, such as BK7 (available from Abrisa Corporation), borosilicate glass (e.g., pyrex available from Corning), aluminosilicate glass (e.g., C1737 available from Corning), or quartz/fused silica. In some embodiments, substrate 140 can be formed from a crystalline material, such as a non-linear optical crystal (e.g., $LiNbO_3$ or a magneto-optical rotator, such as garnett) or a crystalline (or semicrystalline) semiconductor (e.g., Si, InP, or GaAs). Substrate 140 can also be formed from an inorganic material, such as a polymer (e.g., a plastic).

Etch stop layer 130 is formed from a material resistant to etching processes used to etch the material(s) from which portions 112 are formed (see discussion below). The material(s) forming etch stop layer 130 should also be compatible with substrate 140 and with the materials forming grating layer 110. Examples of materials that can form etch stop layer 130 include $HfO_2$, $SiO_2$, $Ta_2O_5$, $TiO_2$, $SiN_x$, or metals (e.g., Cr, Ti, Ni).

The thickness of etch stop layer 130 can be varied as desired. Typically, etch stop layer 130 is sufficiently thick to prevent significant etching of substrate 140, but should not be so thick as to adversely impact the optical performance of polarizer 100. In some embodiments, etch stop layer is about 500 nm or less (e.g., about 250 nm or less, about 100 nm or less, about 75 nm or less, about 50 nm or less, about 40 nm or less, about 30 nm or less, about 20 nm or less).

Cap layer 120 is typically formed from the same material(s) as portions 111 of grating layer 110 and provides a surface 121 onto which additional layers, such as the layers forming antireflection film 150, can be deposited. Surface 121 can be substantially planar.

Antireflection films 150 and 160 can reduce the reflectance of pass state light of wavelength λ impinging on and exiting polarizer 100. Antireflection film 150 and 160 generally include one or more layers of different refractive index. As an example, one or both of antireflection films 150 and 160 can be formed from four alternating high and low index layers. The high index layers can be formed from $TiO_2$ or $Ta_2O_5$ and the low index layers can be formed from $SiO_2$ or $MgF_2$. The antireflection films can be broadband antireflection films or narrowband antireflection films.

In some embodiments, polarizer 100 has a reflectance of about 5% or less of light impinging thereon at wavelength λ for pass state polarization (e.g., about 3% or less, about 2% or less, about 1% or less, about 0.5% or less, about 0.2% or less).

In general, polarizer 100 can be prepared as desired. FIGS. 2A-2J show different phases of an example of a preparation process. Initially, substrate 140 is provided, as shown in FIG. 2A. Surface 141 of substrate 140 can be polished and/or cleaned (e.g., by exposing the substrate to one or more solvents, acids, and/or baking the substrate).

Referring to FIG. 2B, etch stop layer 130 is deposited on surface 141 of substrate 140. The material forming etch stop layer 130 can be formed using one of a variety of techniques, including sputtering (e.g., radio frequency sputtering), evaporating (e.g., electron beam evaporation, ion assisted deposition (IAD) electron beam evaporation), or chemical vapor deposition (CVD) such as plasma enhanced CVD (PECVD), ALD, or by oxidization. As an example, a layer of $HfO_2$ can be deposited on substrate 140 by IAD electron beam evaporation.

Referring to FIG. 2C, an intermediate layer 210 is then deposited on surface 131 of etch stop layer 130. Portions 112 are etched from intermediate layer 210, so intermediation layer 210 is formed from the material used for portions 112. The material forming intermediate layer 210 can be deposited using one of a variety of techniques, including sputtering (e.g., radio frequency sputtering), evaporating (e.g., election beam evaporation), or chemical vapor deposition (CVD) (e.g., plasma enhanced CVD).

In certain embodiments intermediate layer 210 is formed from a metal, such as aluminum. Metal layers can be formed by evaporation (e.g., thermal evaporation), for example. In embodiments, metal layers are formed by evaporating the metal onto surface 131 at relatively fast rates, such as about 5 Angstroms per second or more (e.g., about 10 Angstroms per second or more, about 12 Angstroms per second or more, about 15 Angstroms per second or more), for example. Fast deposition rates can improve the purity of the metal layer by reducing the amount of impurities (such as oxygen) that can incorporate into the film as it is deposited.

In some embodiments, the substrate can be cooled prior to and/or during metal deposition. For example, the substrate can be cooled to about 0° C. or less (e.g., about −20° C. or less, about −50° C. or less). Cooling the substrate can increase the size of metal grains formed on the substrate during deposition. It is believed that lower substrate temperature can reduce the kinetic energy of the metal clusters that tend to prevent the clusters from forming larger grains. Larger metal grain size may be beneficial by providing improved optical characteristics, such as higher reflectance compared to metal layers composed of smaller grains. Moreover, grating layers having short periods can be more easily formed from metal layers having larger grain sizes.

Evaporation can also be performed under relatively high vacuums, such as vacuums of about $10^{-6}$ Torr or less (e.g., about $5\times10^{-7}$ Torr or less, about $2\times10^{-7}$ Ton or less). High vacuum deposition can also improve the purity of the metal layer by reducing the amount of impurities (such as oxygen) present in the vicinity of the deposited layer as it is formed, thereby reducing the amount of impurities that are incorporated in the film.

In some embodiments, substrate 140 is positioned relatively far from the source of the deposited metal in the deposition chamber (e.g., about 12 inches or more, about 15 inches or more, about 20 inches or more, about 24 inches or more). This can increase the uniformity of the deposited material across surface 131 relative to systems in which the source is positioned closer to the substrate.

In general, the thickness of intermediate layer 210 is selected based on the desired thickness of grating layer 110.

Intermediate layer 210 is processed to provide portions 112 of grating layer 110 using lithographic techniques. For example, portions 112 can be formed from intermediate layer 210 using electron beam lithography or photolithography (e.g., using a photomask or using holographic techniques).

In some embodiments, portions 112 are formed using nano-imprint lithography. Referring to FIG. 2D, nano-imprint lithography includes forming a layer 220 of a resist on surface 211 of intermediate layer 210. The resist can be polymethylmethacrylate (PMMA) or polystyrene (PS), for example. Referring to FIG. 2E, a pattern is impressed into resist layer 220 using a mold. The patterned resist layer 220 includes thin portions 221 and thick portions 222. Patterned resist layer 220 is then etched (e.g., by oxygen reactive ion etching (RIE)), removing thin portions 221 to expose portions 224 of surface 211 of intermediate layer 210, as shown in FIG. 2F. Thick portions 222 are also etched, but are not completely removed. Accordingly, portions 223 of resist remain on surface 211 after etching.

Referring to FIG. 2G, the exposed portions of intermediate layer 210 are subsequently etched, forming trenches 212 in intermediate layer 210. The unetched portions of intermediate layer 210 correspond to portions 112 of grating layer 110. Intermediate layer 210 can be etched using, for example, reactive ion etching, ion beam etching, sputtering etching, chemical assisted ion beam etching (CAIBE), or wet etching. The exposed portions of intermediate layer 210 are etched down to etch stop layer 130, which is formed from a material resistant to the etching method. Accordingly, the depth of trenches 212 formed by etching is the same as the thickness of portions 112. After etching trenches 212, residual resist 223 is removed from portions 112. Resist can be removed by rinsing the article in a solvent (e.g., an organic solvent, such as acetone or alcohol), by $O_2$ plasma ashing, $O_2$ RIE, or ozone cleaning.

In some embodiments, an etch mask is formed on the surface of intermediate layer 210 prior to depositing resist layer 220. Etch masks are provide to prevent etching of layer 210 by the etchant used to remove portions of the resist layer. Certain oxide materials (e.g., $SiO_2$) are examples of materials suitable for masking intermediate layer 210 from certain etchants (e.g., reactive ion etchants). For example, a layer of $SiO_2$ can be used to mask a metal layer from a chlorine-based reactive ion etchant. Etch mask layers can be relatively thin (e.g., about 100 nm or less, 50 nm or less, such as in a range from about 20 nm to about 25 nm).

Etching can be performed using commercially-available equipment, such as a TCP® 9600DFM (available from Lam Research, Fremont, Calif.).

More than one etch step can be used. For example, in some embodiments, a two-step etch is used. An example of a two step etching process for Al is as follows. The first etch is performed using a gas mixture composed of BCL3 (e.g., at about 90 sccm), $Cl_2$ (e.g., at about 30 sccm), N2 (e.g., at about 10 sccm), He (e.g., at about 10 Torr) for backside cooling. The radio frequency (RF) power is about 500 W and the chamber pressure about 5 mtorr. The second etch is performed using $Cl_2$ (e.g., at about 56 sccm), HCl (e.g., at about 14 sccm), $N_2$ (e.g., at about 35 sccm), $H_2$ (e.g., at about 10 Torr) for back side cooling. The RF power is about 300 W and the chamber pressure is about 7 mtorr. For a typical 150 nm deep aluminum etching, the first etching time can be about 4 seconds and the second etching time can be about 15 seconds.

In certain embodiments, a post-etching passivation step can be employed to provide a passivation layer on the surface of the etched layer. Post-etching passivation can be done, for example, by exposing the etched layer to an oxidant to produce an oxide layer at the surface of the etched layer. Post-etch passivation of an etched Al layer, for example, can be performed by exposing the etched layer to water vapor at an elevated temperature (e.g., at about 200° C. or more, about 250° C. or more, about 300° C. or more).

Referring to FIG. 2I, after removing residual resist, material is deposited onto the article, filling trenches 212 and forming cap layer 120. The filled trenches correspond to portions 111 of grating layer 110. Material can be deposited onto the article in a variety of ways, including sputtering, electron beam evaporation, CVD (e.g., high density CVD) or atomic layer deposition (ALD). Note that where cap layer 120 is formed and trenches 212 are filled during the same deposition step, portions 111 and cap layer 120 are formed from a continuous portion of material.

Finally, antireflection films 150 and 160 are deposited onto surface 121 of cap layer 120 and surface 142 of substrate 140, respectively. Materials forming the antireflection films can be deposited onto the article by sputtering, electron beam evaporation, or ALD, for example.

In some embodiments, multiple polarizers can be prepared simultaneously by forming a relatively large grating layer on a single substrate, which is then diced into individual units. For example, a grating layer can be formed on a substrate that has a single-side surface area about 10 square inches or more (e.g., a four inch, six inch, or eight inch diameter substrate). After forming the grating layer, the substrate can be diced into multiple units of smaller size (e.g., having a single-side surface area of about one square inch or less).

As discussed previously, in some embodiments, holographic lithography techniques can be used to form a pattern in a layer of resist material on intermediate layer 210. In these techniques, a photosensitive resist layer is exposed to an interference pattern formed by overlapping two or more coherence beams of radiation, usually derived from a laser light source. The varying light intensity of the interference pattern is transferred to the resist material, which can be developed after exposure to provide a patterned resist layer.

Holographic lithography can be used to generate a period intensity pattern by interfering two coherent beams of similar intensity. The technique is particularly versatile as the period of the intensity pattern can be varied by varying the angle at which the two beams interfere.

Theoretically, the period of the intensity pattern, $\Gamma$, is given by the equation:

$$\Gamma = \frac{\lambda_b}{2n \sin \varphi},$$

where $\lambda_b$ is the wavelength of the interfering radiation, n is the refractive index of the medium in which the beams interfere, and $\phi$ is half the angle subtended by the interfering beams. Since $\Gamma$ is proportional to $\lambda_b$, interference patterns having relatively short periods (e.g., about 300 nm or less) can be formed by selecting a light source with a relatively short wavelength (e.g., an argon laser having output at 351 nm). Furthermore, the interference pattern period can be reduced by interfering the two beams at relatively large angles (e.g., $\phi$ about 45 degrees or more). For example, the resist can be exposed to two 351 nm beams with $\phi$ at about 61 degrees to provide a grating having a period of about 200 nm.

In some embodiments, holographic lithography can be performed while immersing the substrate and resist in a medium having a refractive index higher than the refractive index of air. For example, the resist surface can be immersed in a liquid such as water (which has a refractive index of about 1.33) or an organic liquid (e.g., glycerin, which has a refractive index of about 1.5)

Figure 3:
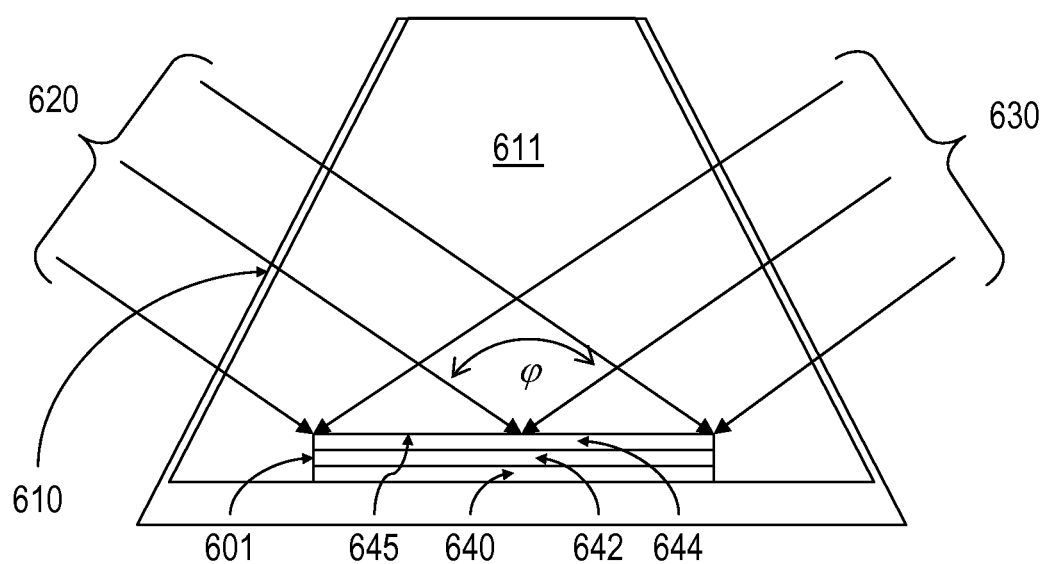
FIG. 3 is a schematic diagram showing exposure of an article in immersion holographic lithography.

For example, referring to FIG. 3, immersion holographic lithography can be performed by immersing an article 601 in a container 610 filled with a liquid 611, such as water or glycerin, and exposing the article to an interference pattern while it is immersed. The interference pattern is formed by interfering coherent beams 620 and 630 at angle $\phi$.

The walls of container 610 can be oriented so that beams 620 and 630 are substantially normally incident. Alternatively, or additionally, certain walls of container 610 can include an antireflection coating to reduce reflection of beams 620 and 630.

Typically, the beams are expanded to provide an interference pattern sufficiently large to expose article 601 in a single exposure. In some embodiments, the beams can be expanded to have a diameter of several inches (e.g., about 4 inches or more, about 6 inches or more, about 8 inches or more).

In the embodiment shown in FIG. 3, article 601 includes a substrate layer 640, an intermediate layer 642 disposed on substrate layer 640, and a photoresist layer 644 disposed on intermediate layer 642. A surface 645 of photoresist layer 644 is exposed to the interference pattern.

Figure 4:
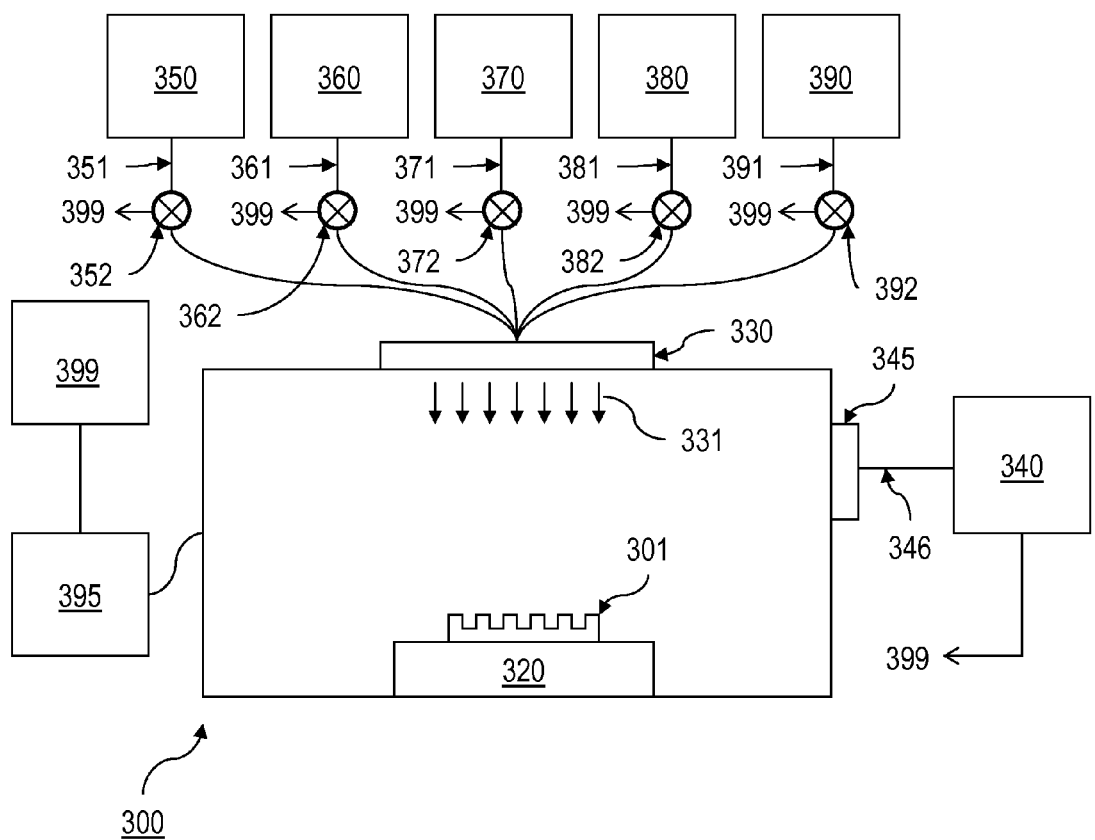
FIG. 4 is a schematic diagram of an atomic layer deposition system.

As mentioned previously, in some embodiments, portions 111 of grating layer 110, cap layer 120, and/or one or both of antireflection films 150 and 160 are prepared using atomic layer deposition (ALD). For example, referring to FIG. 4, an ALD system 300 is used to fill trenches 212 of an intermediate article 301 (composed of substrate 140, cap layer 130, and portions 112) with a nanolaminate multilayer film, forming portions 111 and cap layer 120. Deposition of the nanolaminate multilayer film occurs monolayer by monolayer, providing substantial control over the composition and thickness of the films. During deposition of a monolayer, vapors of a precursor are introduced into the chamber and are adsorbed onto exposed surfaces of portions 112, etch stop layer surface 131 or previously deposited monolayers adjacent these surfaces. Subsequently, a reactant is introduced into the chamber that reacts chemically with the adsorbed precursor, forming a monolayer of a desired material. The self-limiting nature of the chemical reaction on the surface can provide precise control of film thickness and large-area uniformity of the deposited layer. Moreover, the non-directional adsorption of precursor onto each exposed surface provides for uniform deposition of material onto the exposed surfaces, regardless of the orientation of the surface relative to chamber 110. Accordingly, the layers of the nanolaminate film conform to the shape of the trenches of intermediate article 301.

ALD system 300 includes a reaction chamber 310, which is connected to sources 350, 360, 370, 380, and 390 via a manifold 330. Sources 350, 360, 370, 380, and 390 are connected to manifold 330 via supply lines 351, 361, 371, 381, and 391, respectively. Valves 352, 362, 372, 382, and 392 regulate the flow of gases from sources 350, 360, 370, 380, and 390, respectively. Sources 350 and 380 contain a first and second precursor, respectively, while sources 360 and 390 include a first reagent and second reagent, respectively. Source 370 contains a carrier gas, which is constantly flowed through chamber 310 during the deposition process transporting precursors and reagents to article 301, while transporting reaction byproducts away from the substrate. Precursors and reagents are introduced into chamber 310 by mixing with the carrier gas in manifold 330. Gases are exhausted from chamber 310 via an exit port 345. A pump 340 exhausts gases from chamber 310 via an exit port 345. Pump 340 is connected to exit port 345 via a tube 346.

ALD system 300 includes a temperature controller 395, which controls the temperature of chamber 310. During deposition, temperature controller 395 elevates the temperature of article 301 above room temperature. In general, the temperature should be sufficiently high to facilitate a rapid reaction between precursors and reagents, but should not damage the substrate. In some embodiments, the temperature of article 301 can be about 500° C. or less (e.g., about 400° C. or less, about 300° C. or less, about 200° C. or less, about 150° C. or less, about 125° C. or less, about 100° C. or less).

Typically, the temperature should not vary significantly between different portions of article 301. Large temperature variations can cause variations in the reaction rate between the precursors and reagents at different portions of the substrate, which can cause variations in the thickness and/or morphology of the deposited layers. In some embodiments, the temperature between different portions of the deposition surfaces can vary by about 40° C. or less (e.g., about 30° C. or less, about 20° C. or less, about 10° C. or less, about 5° C. or less).

Deposition process parameters are controlled and synchronized by an electronic controller 399. Electronic controller 399 is in communication with temperature controller 395; pump 340; and valves 352, 362, 372, 382, and 392. Electronic controller 399 also includes a user interface, from which an operator can set deposition process parameters, monitor the deposition process, and otherwise interact with system 300.

Figure 5:
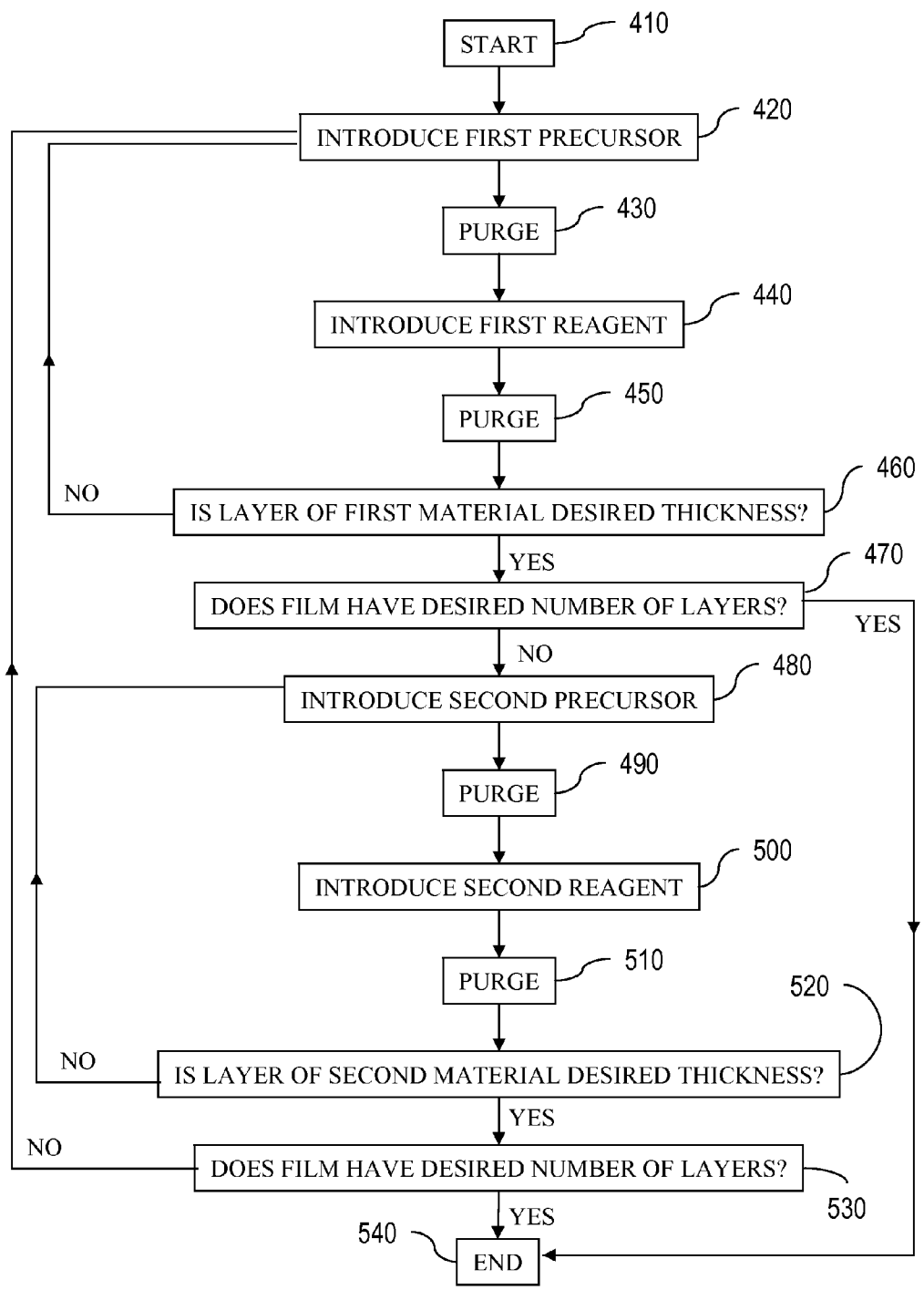
FIG. 5 is a flow chart showing steps for forming a nanolaminate using atomic layer deposition.

Referring to FIG. 5, the ALD process is started (410) when system 300 introduces the first precursor from source 350 into chamber 310 by mixing it with carrier gas from source 370 (420). A monolayer of the first precursor is adsorbed onto exposed surfaces of article 301, and residual precursor is purged from chamber 310 by the continuous flow of carrier gas through the chamber (430). Next, the system introduces a first reagent from source 360 into chamber 310 via manifold 330 (440). The first reagent reacts with the monolayer of the first precursor, forming a monolayer of the first material. As for the first precursor, the flow of carrier gas purges residual reagent from the chamber (450). Steps 420 through 460 are repeated until the layer of the first material reaches a desired thickness (460).

In embodiments where the films are a single layer of material, the process ceases once the layer of first material reaches the desired thickness (470). However, for a nanolaminate film, the system introduces a second precursor into chamber 310 through manifold 330 (380). A monolayer of the second precursor is adsorbed onto the exposed surfaces of the deposited layer of first material and carrier gas purges the chamber of residual precursor (490). The system then introduces the second reagent from source 380 into chamber 310 via manifold 330. The second reagent reacts with the monolayer of the second precursor, forming a monolayer of the second material (500). Flow of carrier gas through the chamber purges residual reagent (510). Steps 580 through 510 are repeated until the layer of the second material reaches a desired thickness (520).

Additional layers of the first and second materials are deposited by repeating steps 520 through 530. Once the desired number of layers are formed (e.g., the trenches are filled and/or cap layer has a desired thickness), the process terminates (540), and the coated article is removed from chamber 310.

Although the precursor is introduced into the chamber before the reagent during each cycle in the process described above, in other examples the reagent can be introduced before the precursor. The order in which the precursor and reagent are introduced can be selected based on their interactions with the exposed surfaces. For example, where the bonding energy between the precursor and the surface is higher than the bonding energy between the reagent and the surface, the precursor can be introduced before the reagent. Alternatively, if the binding energy of the reagent is higher, the reagent can be introduced before the precursor.

The thickness of each monolayer generally depends on a number of factors. For example, the thickness of each monolayer can depend on the type of material being deposited. Materials composed of larger molecules may result in thicker monolayers compared to materials composed of smaller molecules.

The temperature of the article can also affect the monolayer thickness. For example, for some precursors, a higher temperate can reduce adsorption of a precursor onto a surface during a deposition cycle, resulting in a thinner monolayer than would be formed if the substrate temperature were lower.

The type or precursor and type of reagent, as well as the precursor and reagent dosing can also affect monolayer thickness. In some embodiments, monolayers of a material can be deposited with a particular precursor, but with different reagents, resulting in different monolayer thickness for each combination. Similarly, monolayers of a material formed from different precursors can result in different monolayer thickness for the different precursors.

Examples of other factors which may affect monolayer thickness include purge duration, residence time of the precursor at the coated surface, pressure in the reactor, physical geometry of the reactor, and possible effects from the byproducts on the deposited material. An example of where the byproducts affect the film thickness are where a byproduct etches the deposited material. For example, HCl is a byproduct when depositing $TiO_2$ using a $TiCl_4$ precursor and water as a reagent. HCl can etch the deposited $TiO_2$ before it is exhausted. Etching will reduce the thickness of the deposited monolayer, and can result in a varying monolayer thickness across the substrate if certain portions of the substrate are exposed to HCl longer than other portions (e.g., portions of the substrate closer to the exhaust may be exposed to byproducts longer than portions of the substrate further from the exhaust).

Typically, monolayer thickness is between about 0.1 nm and about five nm. For example, the thickness of one or more of the deposited monolayers can be about 0.2 nm or more (e.g., about 0.3 nm or more, about 0.5 nm or more). In some embodiments, the thickness of one or more of the deposited monolayers can be about three nm or less (e.g., about two nm, about one nm or less, about 0.8 nm or less, about 0.5 nm or less).

The average deposited monolayer thickness may be determined by depositing a preset number of monolayers on a substrate to provide a layer of a material. Subsequently, the thickness of the deposited layer is measured (e.g., by ellipsometry, electron microscopy, or some other method). The average deposited monolayer thickness can then be determined as the measured layer thickness divided by the number of deposition cycles. The average deposited monolayer thickness may correspond to a theoretical monolayer thickness. The theoretical monolayer thickness refers to a characteristic dimension of a molecule composing the monolayer, which can be calculated from the material's bulk density and the molecules molecular weight. For example, an estimate of the monolayer thickness for $SiO_2$ is ~0.37 nm. The thickness is estimated as the cube root of a formula unit of amorphous $SiO_2$ with density of 2.0 grams per cubic centimeter.

In some embodiments, average deposited monolayer thickness can correspond to a fraction of a theoretical monolayer thickness (e.g., about 0.2 of the theoretical monolayer thickness, about 0.3 of the theoretical monolayer thickness, about 0.4 of the theoretical monolayer thickness, about 0.5 of the theoretical monolayer thickness, about 0.6 of the theoretical monolayer thickness, about 0.7 of the theoretical monolayer thickness, about 0.8 of the theoretical monolayer thickness, about 0.9 of the theoretical monolayer thickness). Alternatively, the average deposited monolayer thickness can correspond to more than one theoretical monolayer thickness up to about 30 times the theoretical monolayer thickness (e.g., about twice or more than the theoretical monolayer thickness, about three time or more than the theoretical monolayer thickness, about five times or more than the theoretical monolayer thickness, about eight times or more than the theoretical monolayer thickness, about 10 times or more than the theoretical monolayer thickness, about 20 times or more than the theoretical monolayer thickness).

During the deposition process, the pressure in chamber 310 can be maintained at substantially constant pressure, or can vary. Controlling the flow rate of carrier gas through the chamber generally controls the pressure. In general, the pressure should be sufficiently high to allow the precursor to saturate the surface with chemisorbed species, the reagent to react completely with the surface species left by the precursor and leave behind reactive sites for the next cycle of the precursor. If the chamber pressure is too low, which may occur if the dosing of precursor and/or reagent is too low, and/or if the pump rate is too high, the surfaces may not be saturated by the precursors and the reactions may not be self limited. This can result in an uneven thickness in the deposited layers. Furthermore, the chamber pressure should not be so high as to hinder the removal of the reaction products generated by the reaction of the precursor and reagent. Residual byproducts may interfere with the saturation of the surface when the next dose of precursor is introduced into the chamber. In some embodiments, the chamber pressure is maintained between about 0.01 Torr and about 100 Torr (e.g., between about 0.1 Torr and about 20 Torr, between about 0.5 Torr and 10 Torr, such as about 1 Torr).

Generally, the amount of precursor and/or reagent introduced during each cycle can be selected according to the size of the chamber, the area of the exposed substrate surfaces, and/or the chamber pressure. The amount of precursor and/or reagent introduced during each cycle can be determined empirically.

The amount of precursor and/or reagent introduced during each cycle can be controlled by the timing of the opening and closing of valves 352, 362, 382, and 392. The amount of precursor or reagent introduced corresponds to the amount of time each valve is open each cycle. The valves should open for sufficiently long to introduce enough precursor to provide adequate monolayer coverage of the substrate surfaces. Similarly, the amount of reagent introduced during each cycle should be sufficient to react with substantially all precursor deposited on the exposed surfaces. Introducing more precursor and/or reagent than is necessary can extend the cycle time and/or waste precursor and/or reagent. In some embodiments, the precursor dose corresponds to opening the appropriate valve for between about 0.1 seconds and about five seconds each cycle (e.g., about 0.2 seconds or more, about 0.3 seconds or more, about 0.4 seconds or more, about 0.5 seconds or more, about 0.6 seconds or more, about 0.8 seconds or more, about one second or more). Similarly, the reagent dose can correspond to opening the appropriate valve for between about 0.1 seconds and about five seconds each cycle (e.g., about 0.2 seconds or more, about 0.3 seconds or more, about 0.4 seconds or more, about 0.5 seconds or more, about 0.6 seconds or more, about 0.8 seconds or more, about one second or more).

The time between precursor and reagent doses corresponds to the purge. The duration of each purge should be sufficiently long to remove residual precursor or reagent from the chamber, but if it is longer than this it can increase the cycle time without benefit. The duration of different purges in each cycle can be the same or can vary. In some embodiments, the duration of a purge is about 0.1 seconds or more (e.g., about 0.2 seconds or more, about 0.3 seconds or more, about 0.4 seconds or more, about 0.5 seconds or more, about 0.6 seconds or more, about 0.8 seconds or more, about one second or more, about 1.5 seconds or more, about two seconds or more). Generally, the duration of a purge is about 10 seconds or less (e.g., about eight seconds or less, about five seconds or less, about four seconds or less, about three seconds or less).

The time between introducing successive doses of precursor corresponds to the cycle time. The cycle time can be the same or different for cycles depositing monolayers of different materials. Moreover, the cycle time can be the same or different for cycles depositing monolayers of the same material, but using different precursors and/or different reagents. In some embodiments, the cycle time can be about 20 seconds or less (e.g., about 15 seconds or less, about 12 seconds or less, about 10 seconds or less, about 8 seconds or less, about 7 seconds or less, about 6 seconds or less, about 5 seconds or less, about 4 seconds or less, about 3 seconds or less). Reducing the cycle time can reduce the time of the deposition process.

The precursors are generally selected to be compatible with the ALD process, and to provide the desired deposition materials upon reaction with a reagent. In addition, the precursors and materials should be compatible with the material on which they are deposited (e.g., with the substrate material or the material forming the previously deposited layer). Examples of precursors include chlorides (e.g., metal chlorides), such as $TiCl_4$, $SiCl_4$, $SiH_2Cl_2$, $TaCl_3$, $HfCl_4$, $InCl_3$ and $AlCl_3$. In some embodiments, organic compounds can be used as a precursor (e.g., Ti-ethaOxide, Ta-ethaOxide, Nb-ethaOxide). Another example of an organic compound precursor is $(CH_3)_3Al$. For $SiO_2$ deposition, for example, suitable precursors include Tris(tert-butoxy), Tris(tert-pentoxy) silanol, or tetraethoxysilane (TEOS).

The reagents are also generally selected to be compatible with the ALD process, and are selected based on the chemistry of the precursor and material. For example, where the material is an oxide, the reagent can be an oxidizing agent. Examples of suitable oxidizing agents include water, hydrogen peroxide, oxygen, ozone, $(CH_3)_3Al$, and various alcohols (e.g., Ethyl alcohol $CH_3OH$). Water, for example, is a suitable reagent for oxidizing precursors such as $TiCl_4$ to obtain $TiO_2$, $AlCl_3$ to obtain $Al_2O_3$, and Ta-ethaoxide to obtain $Ta_2O_5$, Nb-ethaoxide to obtain $Nb_2O_5$, $HfCl_4$ to obtain $HfO_2$, $ZrCl_4$ to obtain $ZrO_2$, and $InCl_3$ to obtain $In_2O_3$. In each case, HCl is produced as a byproduct. In some embodiments, $(CH_3)_3Al$ can be used to oxidize silanol to provide $SiO_2$.

While certain embodiments have been described, in general, other linear polarizer structures are also possible. For example, while linear polarizer 100 (see FIG. 1) shows a specific configuration of different layers, other embodiments can include additional or fewer layers. For example, in certain embodiments, polarizers need not include one or both of antireflection films 150 and 160. In some embodiments, polarizers can include additional antireflection films (e.g., between substrate layer 140 and etch stop layer 130). Embodiments can also include protective layers, such as hardcoat layers (e.g., hardcoat polymers) on one or both of antireflection films 150 and 160. In certain embodiments, polarizers need not include a cap layer. For example, the cap layer, which forms while filling trenches between portions 112, can be removed once portions 111 are formed. The cap layer can be removed by, e.g., chemical mechanical polishing or etching.

Although embodiments of polarizers have been described that include a grating layer that has a rectangular grating profile, other embodiments are also possible. For example, in some embodiments, the grating layer have a curved profile, such as a sinusoidal profile. Alternative, the grating layer can have a triangular, sawtooth profile, or trapezoidal profile.

Furthermore, while the grating period in the grating layers of polarizers has been described as constant, in certain embodiments the grating period may vary. In some embodiments, portions of grating layers can be non-periodically arranged.

Figure 9A:
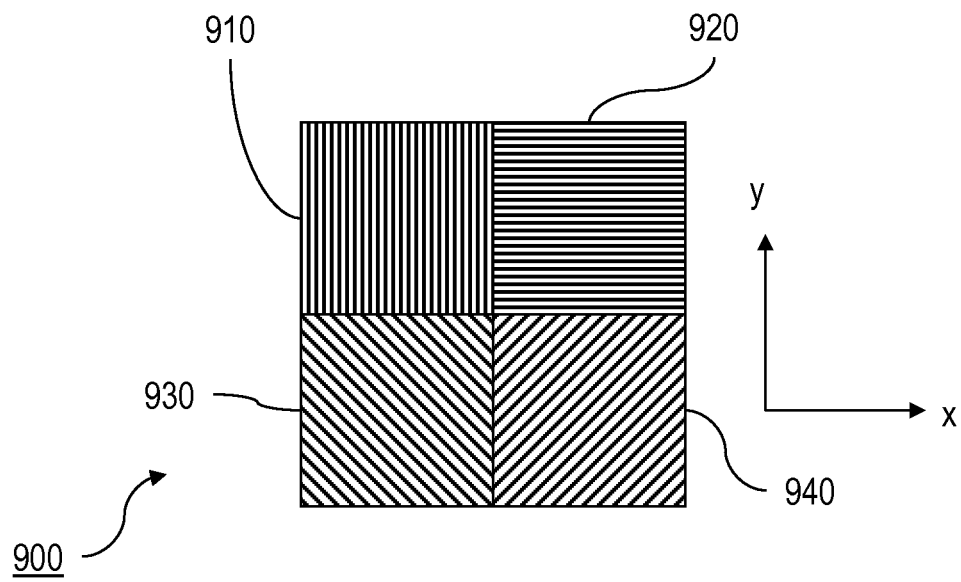
FIG. 9A is a diagram of a polarizer that includes a grating array.

Portions 111 and 112 in grating layer 110 all extend along the same direction, however, in certain embodiments, a linear polarizer can include regions where the portions of the grating layer are oriented along different directions compared to other regions. For example, referring to FIG. 9A, a polarizer 900 include a grating layer that has four different grating regions, 910, 920, 930, and 940, in which the grating portions are aligned along different directions, forming a grating array.

Because the orientation of the pass and block states for each region depend on the orientation of the grating portions in that region, the pass and block states are different for regions having different orientation.

In general, grating arrays can include as many regions as desired. For example, in some embodiments, grating arrays can include several hundred or thousands of regions (e.g., about 500 or more regions, about 1,000 or more regions, about 5,000 or more regions, about 10,000 or more regions). In some embodiments, grating arrays can include regions corresponding to standard graphics array (GA) resolutions (e.g., VGA 640×480, XGA 1024×768, SXGA 1280×1024, UXGA 1600×1200 WXGA 1366×768).

Two or more regions in a grating array can have grating layers having the same orientation. In some embodiments, grating orientations form a repeated pattern. Furthermore, the period and/or duty cycle of each region in a grating array can be the same or different.

Polarizers that include more than one grating region can be prepared by the techniques discussed previously. For example, single or multi-exposure photolithographic methods can be used. Grating arrays can be formed using single step exposures by using a lithography mask that has a pattern corresponding to the grating array. Multiple exposure methods include holographic lithography, where the orientation of the substrate and the interference pattern are changed for each exposure. Pre-exposed regions are masked for subsequent exposures.

Imprint lithography can also be used to form grating arrays by using mold that has the corresponding grating array pattern.

Polarizers such as those described herein can be incorporated into optical devices, including passive optical devices (e.g., polarizing devices) and active optical devices (e.g., liquid crystal displays). Polarizers can be integrated into the device, providing a monolithic device, or can be arranged separately from other components of the device.

Figure 6:
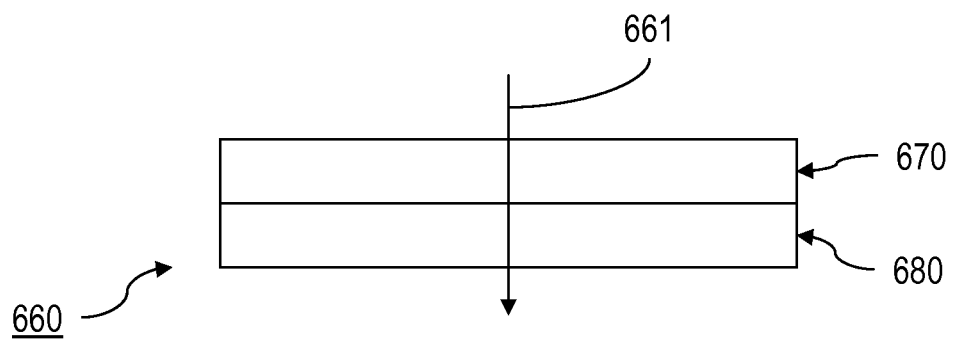
FIG. 6 is a cross-sectional view of a circular polarizer incorporating a linear polarizer.

Referring to FIG. 6, an example of a passive optical device incorporating a linear polarizer, such as linear polarizer 100, is a circular polarizer 660. Circular polarizer 660 includes a linear polarizer 670 and a quarter-waveplate 680.

Linear polarizer 670 linearly polarizes radiation incident on circular polarizer 660 propagating along axis 661 having wavelength λ. Quarter-waveplate 680 then retards the linearly polarized light, providing circularly polarized light exiting polarizer 660. In certain embodiments, the ellipticity of the exiting light can vary as desired by choosing waveplates with varying amounts of retardation instead of quarter-waveplate 680 to provide a desired amount of retardation.

Figure 7:
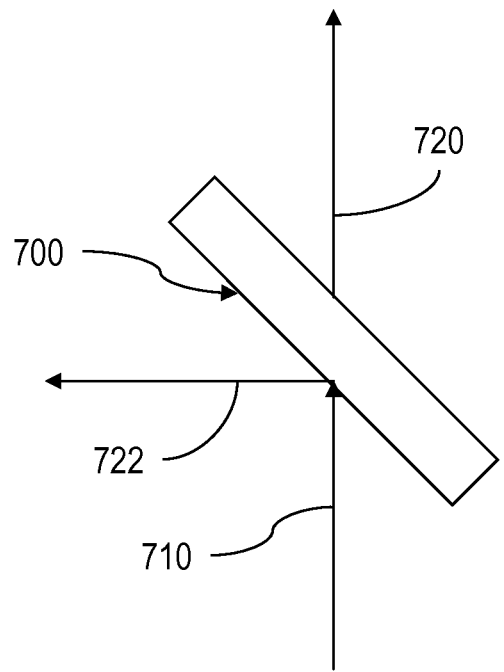
FIG. 7 is a cross-sectional view of a polarizing beam splitter.

Referring to FIG. 7, in some embodiments, linear polarizers can be used as a polarizing beam splitter 700. Polarizing beam splitters (PBSs) typically reflect (e.g., specularly reflect) a relatively large amount of incident block state radiation while transmitting a relatively large amount of the incident pass state radiation. As shown in FIG. 7, PBS 700 is positioned with respect to radiation propagating parallel to axis 710, so that the radiation is incident non-normally on the surface of the PBS. PBS 700 specularly reflects the incident block state radiation, which propagates away from the PBS in direction 722. PBS 700 transmits a relatively large amount of incident pass state radiation, which propagates in direction 720. Accordingly, PBS 700 provides two beams of orthogonally-polarized radiation.

Figure 8:
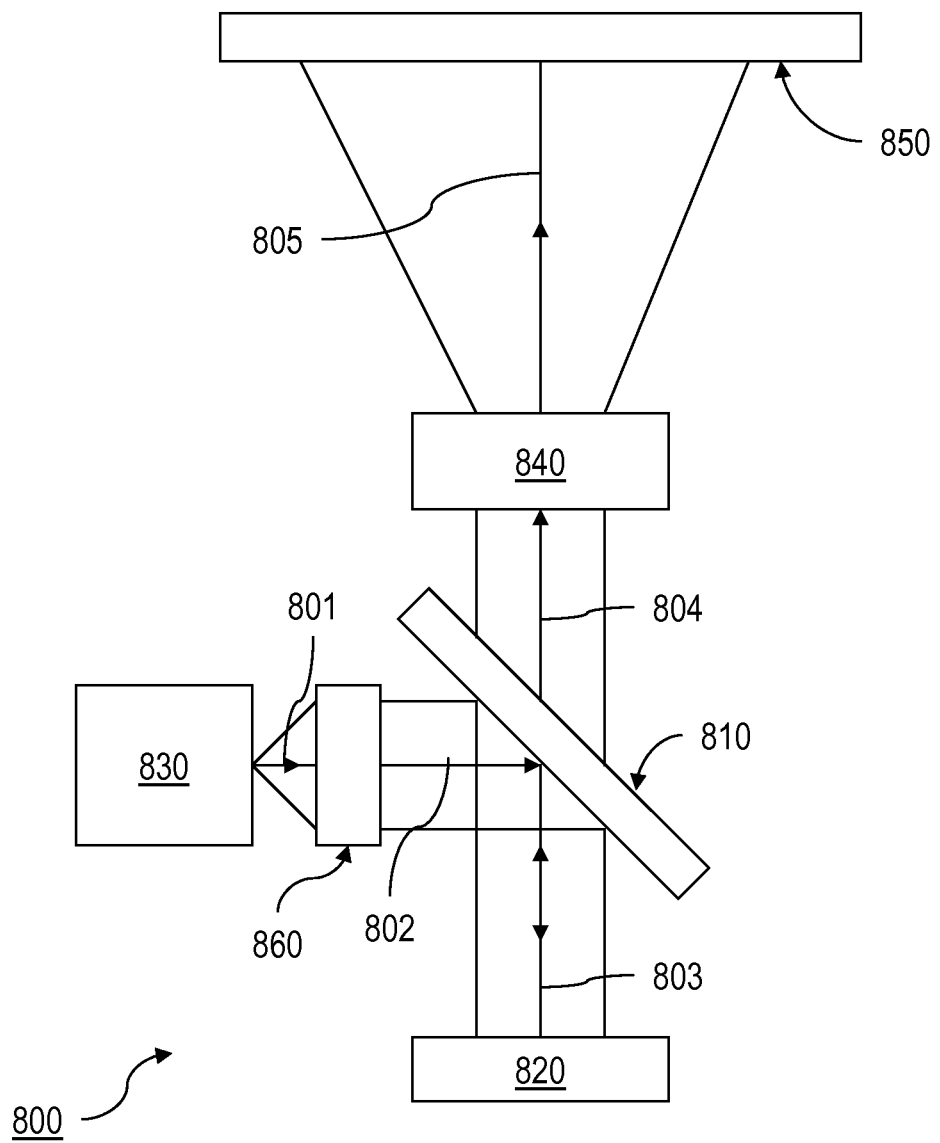
FIG. 8 is a schematic diagram of a liquid crystal projection display.

Polarizing beam splitters can be used in projection displays. For example, referring to FIG. 8, in some embodiments a PBS 810 that includes a linear polarizer is included in a liquid crystal projection display 800. Display 800 also includes a broadband light source 830, beam shaping optics 860, a reflective liquid crystal display panel 820, and projection optics 840. Display 800 is configured to project an image generated by panel 820 onto a projection screen 850.

Display 800 operates as follows. Broadband light source 830 emits radiation 801 that is collimated by beam shaping optics 860 and directed towards polarizing beam splitter 810 as a substantially collimated beam 802. Typically, beam shaping optics 860 include one or more lenses and one or more apertures that gather divergent radiation from source 830 to provide substantially collimated beam 802. In some embodiments, beam shaping optics 860 can include a polarizing element that linearly polarizes the radiation so that beam 802 includes mainly block state radiation.

PBS 810 reflects the block state component of beam 802 towards panel 820. Panel 820 spatially modulates the polarization of incident beam 803, transforming the polarization state of some of the incident radiation, while leaving the polarization state of some of the incident radiation substantially unchanged. As a result, certain portions of reflected beam 803 have pass state polarization. Reflected beam 803 returns to PBS 810 where the portions of the beam having pass state polarization are transmitted, while the rest is blocked by the PBS.

The transmitted radiation, shown as beam 804, propagates to projection optics 804, which projects radiation, indicated by 805, out onto screen 850 where it forms an image. Projection optics 840 conventionally includes one or more lens elements and/or other passive optical components that image panel 820 to screen 850. The image is typically magnified substantially, so that a relatively small panel can be used to provide a relatively large image that can be viewed by a suitably situated observer.

Figure 9B:
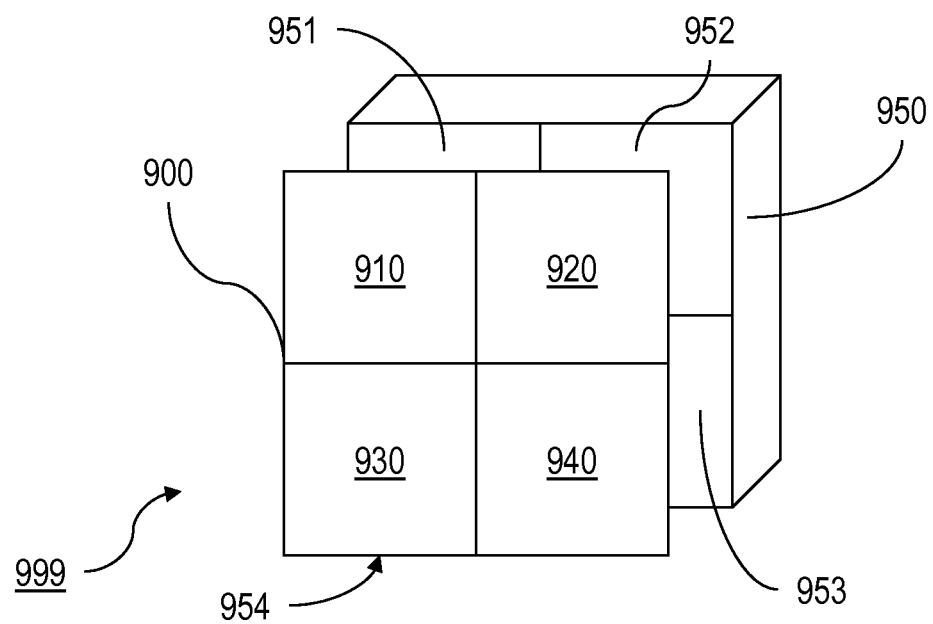
FIG. 9B is a diagram of a detector assembly including a grating array.

Referring to FIG. 9B, in some embodiments, grating arrays, such as polarizer 900, can be used as polarization analyzers with a detector array 950 to provide a detector assembly 999 capable of simultaneously sampling different polarization components of an incident beam. Detector array 950 includes elements 951, 952, 953, and 954 that correspond to regions 910, 920, 930, and 940 of polarizer 900. Because each region of polarizer 900 has its pass state oriented differently to the other regions, each detector element in detector array 950 measures the intensity of a different polarization component.

In some embodiments, the grating array can be formed directly on the detector elements. Alternatively, polarizer 900 can be affixed to detector 950 (e.g., using an adhesive).

In some embodiments, detector assembly 999 can be used in a polarimeter to measure the polarization state (e.g., the Stokes parameters) of incident light by a single measurement at each detector element. Additional components, such as a retarder (e.g., a retarder array), such as a quarter wave plate or quarter wave plate array, and/or a polarizer (e.g., another polarizer array) can be integrated with polarizer 900 to provide a compact polarimeter assembly. Retarders and/or polarizers can be integrated with polarizer 900 using the techniques disclosed herein and the techniques disclosed in U.S. patent application Ser. No. 10/866,416, entitled "OPTICAL FILMS AND METHODS OF MAKING THE SAME," filed on Jun. 11, 2004.

Such a polarimeter is referred to as a wavefront division polarimeter because it divides up an incident wavefront into different components and samples a different polarization components for each component.

Polarimeter arrays can also be formed using multiple detector assemblies. The detector assemblies can be integrated into a single component. For example, the detector arrays corresponding to each detector assembly can be formed on the same substrate. Polarimeter arrays can be used in imaging applications.

An example of a technique for measuring polarization using a grating is described by F. Gori, in "Measuring Stokes parameters by means of a polarization grating", Opt. Lett., Vol. 24, No. 9, 584 (1999).

Other applications for polarizers include use in an optical isolator. In some embodiments, an optical isolator can include a polarizer formed directly on a magneto-optic or electro-optic component (such as a garnet crystal) using the techniques described above.

A number of embodiments have been described. Other embodiments are in the following claims.

What is claimed is:

1. A method of manufacturing a polarizer for a selected wavelength of light, comprising:
   providing a surface of a layer of a first material of an article, said surface comprising a series of trenches having widths of about 100 nm or less, and depths of at least 50 nm, and filling the trenches to at least 10% of their volumes by sequentially forming a plurality of monolayers of a second material different from the first material within the trenches, and conformally coating the surfaces of the trenches by providing at least one monolayer disposed in the trenches by atomic layer deposition (ALD), and wherein
   the first and second materials and the trench widths and depths are selected such that the layer transmits about 50% or more of light of the selected wavelength having a first polarization state incident on the layer along a path, and blocks about 80% or more of light of the selected wavelength having a second polarization state incident on the layer along the path, where the first and second polarization states are orthogonal; and the selected wavelength is in the ultraviolet range.

2. The method of claim 1, wherein the trench is formed by etching a continuous layer of the first material.

3. The method of claim 2, wherein etching the first layer comprises reactive ion etching.

4. The method of claim 1, wherein the trench is formed lithographically.

5. The method of claim 4, wherein the trench is formed using nanoimprint lithography.

6. The method of claim 5, wherein the nano-imprint lithography includes forming a pattern in a thermoplastic material.

7. The method of claim 5, wherein the nano-imprint lithography includes forming a pattern in a UV curable material.

8. The method of claim 4, wherein the trench is formed using holographic lithography.

9. The method of claim 8, wherein the holographic lithography comprises immersing a layer of the first material in a fluid having a refractive index higher than a refractive index of air.

10. The method of claim 8, wherein the holographic lithography comprises exposing a layer of a resist material to an interference pattern formed from radiation having a wavelength of about 400 nm or less.

11. The method of claim 1, wherein the first material comprises at least one metal selected from the group consisting of Au and Ag.

12. The method of claim 1, wherein the trench has a width of about 70 nm or less.

13. The method of claim 1, wherein the trench has a width of about 40 nm or less.

14. The method of claim 1, wherein the trench has a depth of about 200 nm or more.

15. The method of claim 1, wherein the trench has a depth of about 130 nm or more.

16. The method of claim 1, further comprising forming one or more monolayers of a third material within the trench, wherein the third material is different from the first and second materials.

17. The method of claim 16, wherein the monolayers of the second and third materials form a nanolaminate material.

18. The method of claim 1, wherein the layer of the first material and the second material form a continuous layer.

19. The method of claim 1, wherein forming the plurality of monolayers of the second material comprises depositing a monolayer of a precursor and exposing the monolayer of the precursor to a reagent to provide a monolayer of the second material.

20. The method of claim 19, wherein the reagent chemically reacts with the precursor to form the second material.

21. The method of claim 20, wherein the reagent oxidizes the precursor to form the second material.

22. The method of claim 19, wherein depositing the monolayer of the precursor comprises introducing a first gas comprising the precursor into a chamber housing the article.

23. The method of claim 22, wherein a pressure of the first gas in the chamber is about 0.01 to about 100 Torr while the monolayer of the precursor is deposited.

24. The method of claim 22, wherein exposing the monolayer of the precursor to the reagent comprises introducing a second gas comprising the reagent into the chamber.

25. The method of claim 24, wherein a third gas is introduced into the chamber after the first gas is introduced and prior to introducing the second gas.

26. The method of claim 25, wherein the third gas is inert with respect to the precursor.

27. The method of claim 25, wherein the third gas comprises at least one gas selected from the group consisting of helium, argon, nitrogen, neon, krypton, and xenon.

28. The method of claim 22, wherein a pressure of the second gas in the chamber is about 0.01 to about 100 Torr while the monolayer of the precursor is exposed to the reagent.

29. The method of claim 19, wherein the precursor comprises at least one precursor selected from the group consisting of tris(tert-butoxy)silanol, $(CH_3)_3Al$, $TiCl_4$, $SiCl_4$, $SiH_2Cl_2$, $TaCl_3$, $AlCl_3$, Hf-ethoxide and Ta-ethoxide.

30. The method of claim 1, wherein the second material comprises at least one material selected from a group consisting of $SiO_2$, $SiN_x$, Si, $Al_2O_3$, $ZrO_2$, $Ta_2O_5$, $TiO_2$, $HfO_2$, $Nb_2O_5$, and $MgF_2$.

31. The method of claim 1, wherein the layer of the first material comprises additional trenches formed in the surface of the layer.

32. The method of claim 31, wherein the trenches are separated by rows of the first material.

33. The method of claim 1, wherein the layer of the first material forms a surface relief grating.

34. The method of claim 33, wherein the surface relief grating has a grating period of about 200 nm or less.

35. The method of claim 33, wherein the surface relief grating has a grating period of about 130 nm or less.

36. The method of claim 1, further comprising forming an anti-reflection film on a surface of the article.

37. The method of claim 1, wherein the article further comprises a substrate supporting the layer of the first material.

38. The method of claim 37, wherein the substrate comprises a layer of an inorganic glass material.

39. A polarizer, comprising: a first material having a surface, said surface comprising a trench having a width of less than 150 nm and a depth of at least 50 nm, and a plurality of monolayers of a second material different from the first material formed within the trench to a depth of at least 10%, wherein at least one monolayer is disposed in the trench by atomic layer deposition (ALD) to conformally coat the surface of the trench, wherein the first and second materials, and the trench width and depth selected such that the polarizer transmits about 50% or more of light of a selected wavelength having a first polarization state incident on the layer along a path, and blocks about 80% or more of light of the selected wavelength having a second polarization state incident on the layer along the path, where the first and second polarization states are orthogonal; and the selected wavelength is in the ultraviolet range.

40. The polarizer of claim 39, wherein the trench has a width of about 70 nm or less.

41. The polarizer of claim 39, wherein the trench has a width of about 40 nm or less.

42. The polarizer of claim 39, wherein the trench has a depth of about 100 nm or more.

43. The polarizer of claim 39, wherein the trench has a depth of about 150 nm or more.

44. The polarizer of claim 39, wherein the trench has a depth of about 300 nm or more.

45. The polarizer of claim 39, further comprising forming one or more monolayers of a third material within the trench, wherein the third material is different from the first and second materials.

46. The polarizer of claim 45, wherein the monolayers of the second and third materials form a nanolaminate material.

47. The polarizer of claim 39, wherein the layer of the first material and the second material form a continuous layer.

48. The polarizer of claim 39, wherein the second material comprises at least one material selected from a group consisting of $SiO_2$, $SiN_x$, Si, $Al_2O_3$, $ZrO_2$, $Ta_2O_5$, $TiO_2$, $HfO_2$, $Nb_2O_5$, and $MgF_2$.

49. The polarizer of claim 39, wherein the layer of the first material comprises additional trenches formed in the surface of the layer.

50. The polarizer of claim 49, wherein the trenches are separated by rows of the first material.

51. The polarizer of claim 39, wherein the layer of the first material forms surface relief grating.

52. The polarizer of claim 51, wherein the surface relief grating has a grating period of about 500 nm or less.

53. The polarizer of claim 51, wherein the surface relief grating has a grating period of about 200 nm or less.

54. The polarizer of claim 39, further comprising forming an anti-reflection film on a surface of the article.

55. The polarizer of claim 39, wherein the article further comprises a substrate supporting the layer of the first material.

56. The polarizer of claim 55, wherein the substrate comprises a layer of an inorganic glass material.

57. The polarizer of claim 39, further comprising a grating element width of 200 nm or less.

58. The polarizer of claim 39, further comprising a grating element width of 100 nm or less.

* * * * *